(12) United States Patent
Cooperman et al.

(10) Patent No.: US 6,247,007 B1
(45) Date of Patent: *Jun. 12, 2001

(54) HIERARCHICALLY ARRANGED KNOWLEDGE DOMAINS

(75) Inventors: Marc Cooperman, Short Hills, NJ (US); Robert Karch, Riverside, CT (US)

(73) Assignee: Teleran Technologies, Inc., East Hanover, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,091

(22) Filed: Feb. 22, 1999

Related U.S. Application Data

(62) Division of application No. 08/848,622, filed on Apr. 29, 1997, now Pat. No. 5,875,440.

(51) Int. Cl.[7] .................................................. G06F 17/00
(52) U.S. Cl. ............................................ 706/50; 706/47
(58) Field of Search .......................................... 706/50, 47

(56) References Cited

U.S. PATENT DOCUMENTS

| | | | | |
|---|---|---|---|---|
| 4,658,370 | * | 4/1987 | Erman et al. ........................... | 706/50 |
| 4,688,195 | * | 8/1987 | Thompson et al. ..................... | 706/11 |
| 4,866,635 | * | 9/1989 | Kahn et al. ............................. | 706/46 |
| 4,884,217 | * | 11/1989 | Skeirik et al. .......................... | 706/56 |
| 5,197,005 | * | 3/1993 | Schwartz et al. ........................ | 707/2 |
| 5,386,559 | * | 1/1995 | Eisenberg et al. ..................... | 707/201 |
| 5,487,135 | * | 1/1996 | Freeman .................................. | 706/59 |
| 5,615,112 | * | 3/1997 | Liu Sheng et al. ..................... | 706/50 |
| 5,675,784 | * | 10/1997 | Maxwell et al. ....................... | 707/100 |
| 5,694,524 | * | 12/1997 | Evans ...................................... | 706/12 |
| 5,835,758 | * | 11/1998 | Nochur et al. ........................ | 707/102 |
| 5,855,011 | * | 12/1998 | Taksuoka ............................... | 706/45 |
| 6,018,346 | * | 1/2000 | Moran et al. ........................... | 705/12 |
| 6,029,195 | * | 2/2000 | Herz ....................................... | 709/219 |

OTHER PUBLICATIONS

Cardiff, J.P., "The Use of Integrity Constraints to Perform Query Transformations in Relational Databases", IEEE International Conference on Databases, Parallel Architectures and Their Applications, Mar. 1990.*

Mallen et al, "Utilising Domain Knowledge in Inductive Knowldge Discovery", IEE Colloquium on Knowledge Discovery in Databases, 1995.*

Troyano et al, "A Technique for Distributed Systems Specification", IEEE Proceedings of Euromicro Workshop on Parallel and Distributed Processing, Jan. 1995.*

Chu et al, "Fault Tolerant Distributed Database System via Data Inference" IEEE Proceedings of the 9th Symposium on Reliable Distributed Systems, Oct. 1990.*

* cited by examiner

Primary Examiner—George B. Davis
(74) Attorney, Agent, or Firm—Kaplan & Gilman, LLP

(57) ABSTRACT

An improved expert system is disclosed wherein rules are organized into domains and subdomains, and objects are passed to rules to be operated upon. Prior to operating upon any object, the domain determines if the object is of the type which is to be operated upon by rules within the rule domain. If not, the rules are not applied to the object.

3 Claims, 1 Drawing Sheet

HIERARCHICALLY ARRANGED KNOWLEDGE DOMAINS

Figure 1:
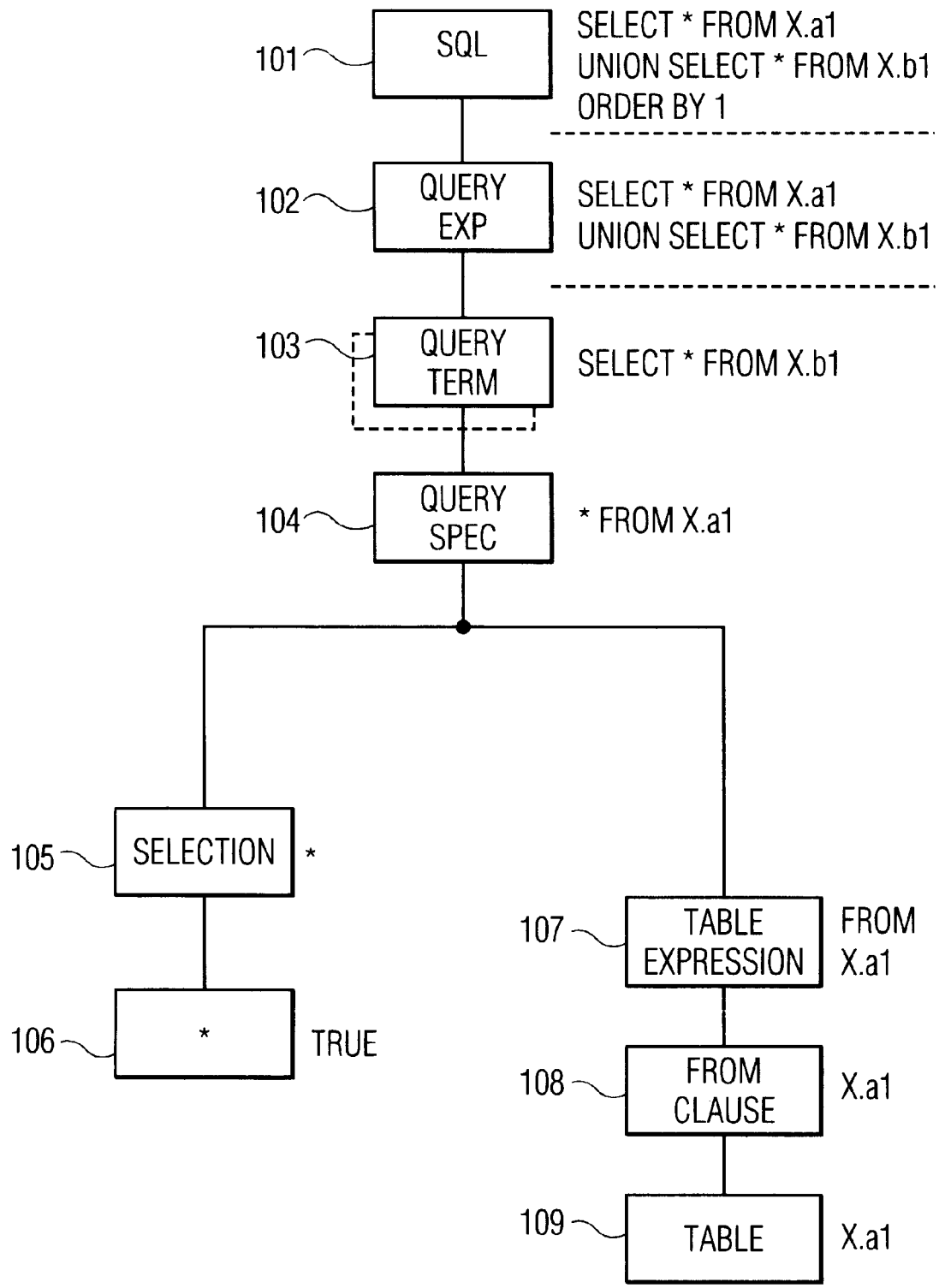

This application is divisional of application Ser. No. 08/848,622, filed Apr. 29, 1997, U.S. Pat. No. 5,875,440.

TECHNICAL FIELD

This invention relates to expert systems, and more specifically, to a hierarchically arranged system of rules which provide an efficient method for operating on various objects, where such objects may be indeterminent at the time such rules are written.

BACKGROUND OF THE INVENTION

Recently, expert systems have come into use in the management and operation of large computer and other systems. Such expert Systems typically rely upon a plurality of rules which are applied to make decisions about the operation of the system intended to be governed by the rules.

One problem with such systems is that they are typically application specific, or, if not totally application specific, are intertwined with the particular application so much that portability and/or modification is problematic. Thus, while an expert system can be written to govern a particular set of circumstances, any time a new problem arises which an operator desires to control via the expert system, the system must be substantially modified and often totally rewritten in order to be ported to a new application. Even slight modifications to the existing application often require substantial reworking of the entire expert system.

One prior art reference which is directed to rules organized in an expert system hierarchy is U.S. Pat. No. 5,619,621 to Puckett. The '621 patent includes a plurality of rules which are broken down into sets and subsets and sub-subsets, and also provides a technique for executing the rules in an appropriate order. The rules are intended, in the main exemplary embodiment, to diagnose faults and other problems in an automated data storage system. The hierarchial set of rules is organized to correspond with a hierarchy of potential problems within this system. Thus, the highest level of rules in the hierarchy determines which of a plurality of high level data storage modules have malfunctioned. If so, the next level of rules determines what particular sub-portion of the module caused the malfunction. Each level in the hierarchy operates upon facts returned by a rule executed at the next higher level of the hierarchy.

The arrangement of the rules in such a manner allows for efficient application of the rules to various different problems which may arise with the system under consideration. The rules however, can only operate upon specified objects, namely, a database record in a particular format. Thus, if the structure of the database record is changed, or the knowledge system is to be applied in a totally different application, the whole system must be substantially rewritten.

Additionally, the rules at each level of the hierarchy are not restricted at all. Specifically, the rules operate on all types of data returned from other rules, and cause various activities to take place in response to such rules. Accordingly, minor changes in the databases or the system require that most of the software implementing the system be rewritten.

Moreover, in the '621 patent, no attempt has been made to provide for portable expert systems which are usable across a variety of fields of endeavor. Additionally, in certain applications, the data upon which the rules will operate will not actually exist until after such rules are already coded and compiled. Thus, it would be difficult to write a set of rules which apply to data items that have not yet in fact been created. The teaching of the '621 patent provides no solution to this problem.

Additionally, it is always desirable for any rule based expert system to learn from experience as the system operates. Ideally, the system should learn from as many different sources as possible. The '621 patent provides a single and permanent rule base which does not change or update itself.

Another issue not addressed by the '621 patent relates to the formation of the rules themselves. Specifically, there are no safeguards built into the rule set to ensure the proper hierarchical structure of the rule set is preserved.

Recently, object orientated programming has become a preferred technique for implementing systems. In object oriented programming, objects are passed to different software routines, and the software operates upon the object.

Objects, for purposes of explanation herein, are anything that have a set of attributes and to which rules can be applied. For example, a database query is an object. A file is an object.

Objects are organized into domains, with objects having common attributes, regardless of the values of such attributes, being classified into a common domain. Objects in a domain may have numerous attributes which differ, as long as they all have the common subset of attributes required to meet the definition of the domain. Each domain of objects may have subdomains, and each subdomain may have further subdomains.

There are no known rule based systems for easily operating on objects of different types and which may be easily ported to other applications. Additionally, although object oriented systems can provide a technique for each object to identify itself as a particular type of object, there are no known rule based systems that take advantage of this fact.

SUMMARY OF THE INVENTION

The above and other problems of the prior art are overcome in accordance with the present invention which relates to a novel technique of organizing, structuring, applying, and updating rules in a knowledge system such that the rules are simplistic, portable, and efficiently applied to a variety of objects, one or more of which may be unknown at the time such rules are initially put into place.

In accordance with the invention, the rules are organized into a hierarchical structure and a variety of objects may be passed to the rules at the highest levels of the hierarchy. The highest level of the hierarchy includes one or more domains. A domain may have objects passed to it whether or not the rules from that domain are to be applied to such objects.

Before a rule in a domain executes, the domain first determines if the object which has been passed to such rule is an object type to which rules in the domain apply. If not, the object is said to be not within the "domain" of the rule. In such a situation, rules at any level below such rule in the hierarchy are not to be executed, and thus efficiency is maximized by automatically concluding that any rule related to such rule is inapplicable to such an object.

Every object passed to any domain of rules is first interrogated to determine what type of object it is. This can be accomplished with features included in modern object oriented languages. If the object is not of the type to which rules in the particular domain apply, or if the object does not identify itself as being of any particular type, then the rules are simply not applied. Thus, if objects are added after the system has been built, the system need not be substantially rewritten. Rather, the domains will simply determine that the new objects do or do not fall within their respective domains, and thus, the rules will or will not, respectively, be applied to such domains.

The hierarchy of domains is organized so that as the hierarchy is traversed, each level differs by the minimum possible amount. Thus, the domains proceed, for example, from a database to a, record to a field, not from a database to a field.

DETAILED DESCRIPTION OF THE PREFERRED EMBODIMENT

FIG. 1 shows a hierarchical arrangement of domains and subdomains in accordance with the teachings of the present invention. The arrangement of FIG. 1 is intended to implement a rule which will govern database queries typically written in a high level language such as SQL. The object represented by the domains of FIG. 1 is an SQL query.

The SQL queries are intended toi retrieve one or more database records from the database and present them to an operator in a specified manner. The syntax and format of the SQL language is well known to those of ordinary skill in the art, and will not be described in detail herein.

The exemplary rule discussed herein for purposes of explanation is intended to prohibit queries which result in an overwhelmingly large amount of database records being retrieved. Specifically, the exemplary query "Select * from X.A1 union Select * from X.B1 order by 1" is not an acceptable query. The query selects all database records from table X.A1 and X.B1 and returns all values in all columns. This query, according to the rule, should not be permitted because the table X.A1 is too large and will result in too.many rows being retrieved.

In accordance with the SQL language, database queries have certain attributes. The attributes of the database queries are defined by the language itself, and include such attributes as selection, from clause, etc. The domain's interface must sufficiently describe the object's attributes. In certain object oriented languages (e.g. JAVA) an object may be tested at run time in order to ascertain which interface that particular object implements. The object oriented language JAVA, can automatically determine what type of object is being passed at run time.

In accordance with the teachings of the present invention, and with reference to FIG. 1, the domain selector SQL determines that the object being passed is in fact an SQL query. This means that the set of rules governing SQL Queries is applicable to this particular object.

The domain itself is said to have attributes. Attributes of a domain may include subdomains, or may include what are termed terminal attributes. A terminal attribute point is a value that can actually be tested such as a character string, a boolean variable, a number, etc.

Returning to the flow chart of FIG. 1, after a determination is made that the object is within the SQL domain, a subdomain selector, query expression 102, is utilized to determine that this object being passed includes a query expression. Again, the fact that the object is within the query expression domain means that the rules in the query expression domain apply to the object. The query expression is that part of the SQL statement which defines the query, independent of the order statement. The query expression is shown written next to query expression block 102 in FIG. 1.

Next, the query term is determined to be present at block 103, and the query specification is then determined to be present at block 104. Once the query specification is extracted, the selection clause is extracted at block 105 and the asterisk is evaluated to true at block 106. Since the asterisk means all records are selected, the rule disallows the query within the domain of all SQL queries.

Next, block 107 is applied which extracts a table expression and passes control through block 108 which extracts a from clause. The from clause contains a list of tables. In the particular example given, the from clause contains only one table name. Next, block 109 extracts the table name from the list.

After the system has executed blocks 106 and 109, it is determined that the query is impermissible. Accordingly, the rule prohibits the query.

Thus, in order to preclude the exemplary query described above, the system performs the following rules at the following domains: (101) is the system an SQL statement that has a query expression, (102) is the query expression one that has a query term (103) is the query term one that has a query specification (104) does the query specification have a selection clause and/or a table expression (105) does the selection clause have an asterisk (106) is the asterisk present (1071) does the table expression have a from clause, (108) does the from clause contain a table name (109) is the table "X.A1". By structuring the rules in such a manner, each rule references only its own domain and domains directly below it. This is important to minimize the effect of changes to domains on the effectiveness of the rule hierarchy.

Notice that in each level of the hierarchy, there are essentially only two types of rules which may exist and which may be applied to the objects as they are received. Using the query spec subdomain 104, the hierarchy defines that query specs may include one or more of at least two items: selection clauses and/or table expressions. Thus, any rule written within query spec domain 104 may only do one of two things. First, the rule can determine if the object passed in fact includes a query spec. Second, the rule can determine if the attributes of query specs, namely selection clauses or table expressions, are present in the particular object passed, and if they are, can be passed to rules of other subdomains.

Rules within the SQL domain 101 may not, for example, compare the select clause of the SQL statement to something, because the select clause is not directly available in the SQL domain. The domain 101 may not test to determine whether or not a selection clause contains an asterisk. Rather, the SQL domain 101 may only check whether or not the object being passed is in fact an SQL query, and whether it has a query expression. At each domain, the highest level of building block possible forms the subdomain below.

In the example of FIG. 1, at level 104 of the hierarchy, rules within query spec domain 104 may test to determine whether an object being passed is within query spec domain 104, but rules within query spec domain 104 may also test for two other items. Specifically, the rules may determine the presence of a selection clause, or the rules may determine the presence of a table expression. This is because the domain query spec 104 has several subdomains connected directly to it. Thus, if a domain has several subdomains connected directly to it, any of those subdomains may be referenced in the parent domain. A terminal node, previously discussed, is a domain attribute that has no further subdomains.

Each time rules are updated or added to any level of the hierarchy, each rule is checked to determine if it fits within the domain to which it has been added. Specifically, the rules proposed to be added are checked to be sure that they do not reference attributes outside of the rule's domain. If any proposed rule does not meet the specified criteria, the rule is not permitted in the hierarchy. By structuring the rules in such a manner, if new objects are added which were not known at the time the rules were derived, potential modifications to the system are limited only to rules within the changed domain. Thus, rules within any domain are insulated from changes in rules in other domains.

An example of rules not permitted by the inventive system will help to clarify. With reference to our same example of FIG. 1, suppose it is desired to have a rule which prevents execution of all SQL queries which attempt to access data from table X.C1. The system would not permit a rule that: says "If the object is an SQL query, and if it is selecting records from the X.C1 table, then prevent access to the table". With reference to FIG. 1, the only thing that a rule within a domain may do is check to see if the object passed is within its domain, or check an attribute of the domain. A rule in the SQL domain therefore, may not directly check the selection clause, and the proposed rule is therefore not allowed. This is significant since checking the selection clause directly if it did not exist could cause a premature termination of the application.

In order to implement the functionality of the proposed rule, complex rules must be decomposed into a hierarchy of simple rules. It can be appreciated however, that the domain structure set forth in FIG. 1 would in fact permit such functionality to be implemented in accordance with the foregoing discussion.

While the above describes the preferred embodiment of the invention, it is understood that various modifications and/or additions will be apparent to those of ordinary skill in the art. For example, the object analyzed need not be an SQL query. Additionally, domains may be linked to plural subdomains, and vice versa. These and other variations are intended to be covered by the following claims.

What is claimed is:

1. A method of representing a relationship between rules, said rules being applicable to a plurality of objects, said objects each containing attributes, said method comprising:

classifying the rules into domains, with rules applicable to any and all objects having a common set of attributes being in a common domain;

arranging the domains in a hierarchy and restricting the rules in each domain to those having said common attributes to thereby render rules in each domain insulated from changes to rules in other domains in the hierarchy.

2. A method of representing and organizing rules in a knowledge system, said method comprising:

dividing the rules into domains;

arranging said domains in a hierarchy;

restricting the rules to those having a common set of attributes so that rules in a particular domain may only access subdomains or terminal attributes directly available to said particular domain and disqualifying rules that do not have said common set of attributes.

3. A method of representing a relationship between rules, said rules being applicable to a plurality of objects, said objects each containing attributes, said method comprising:

classifying the rules into domains, with rules applicable to any and all objects having a common set of attributes being in a common domain;

arranging the domains in a hierarchy; and disqualifying rules if they do not either (i) test to determine if an object passed to the domain is in fact in the domain or (ii) test to determine if the object is in a domain having a specified relationship to said domain.

* * * * *